US010466706B2

United States Patent
Prasad

(10) Patent No.: US 10,466,706 B2
(45) Date of Patent: Nov. 5, 2019

(54) AUTOMATED GUIDANCE SYSTEM

(71) Applicant: APTIV TECHNOLOGIES LIMITED, St. Michael (BB)

(72) Inventor: Premchand Krishna Prasad, Westfield, IN (US)

(73) Assignee: APTIV TECHNOLOGIES LIMITED (BB)

( * ) Notice: Subject to any disclaimer, the term of this patent is extended or adjusted under 35 U.S.C. 154(b) by 173 days.

(21) Appl. No.: 15/676,051

(22) Filed: Aug. 14, 2017

(65) Prior Publication Data

US 2019/0049972 A1 Feb. 14, 2019

(51) Int. Cl.
| | |
|---|---|
| *G05D 1/02* | (2006.01) |
| *B62D 6/00* | (2006.01) |
| *B62D 15/02* | (2006.01) |
| *G08G 1/16* | (2006.01) |

(52) U.S. Cl.
CPC ........... *G05D 1/0212* (2013.01); *B62D 6/001* (2013.01); *B62D 15/025* (2013.01); *B62D 15/026* (2013.01); *G05D 1/0231* (2013.01); *G05D 1/0246* (2013.01); *G05D 1/0257* (2013.01); *G05D 1/0276* (2013.01); *G08G 1/167* (2013.01)

(58) Field of Classification Search
CPC .. G05D 1/0212; G05D 1/0231; G05D 1/0246; G05D 1/0257; G05D 1/0276; B62D 6/001; B62D 15/025; B62D 15/026; G08G 1/167
See application file for complete search history.

(56) References Cited

U.S. PATENT DOCUMENTS

| | | | | |
|---|---|---|---|---|
| 2008/0125972 | A1* | 5/2008 | Neff ...................... | B60W 40/02 |
| | | | | 701/300 |
| 2016/0231747 | A1* | 8/2016 | Neff ...................... | G05D 1/0231 |
| 2016/0288790 | A1* | 10/2016 | Aoki .................... | B60W 30/165 |
| 2017/0160744 | A1* | 6/2017 | Chia .................... | G05D 1/0088 |
| 2017/0166207 | A1* | 6/2017 | Darms ................ | B60W 30/165 |
| 2017/0225686 | A1* | 8/2017 | Takaso .................. | G08G 1/167 |
| 2018/0024562 | A1* | 1/2018 | Bellaiche ................ | G01S 19/48 |
| | | | | 701/26 |
| 2018/0259966 | A1* | 9/2018 | Long .................... | G05D 1/0214 |

OTHER PUBLICATIONS

European Search Report, dated Jan. 14, 2019.

* cited by examiner

*Primary Examiner* — Courtney D Heinle
(74) *Attorney, Agent, or Firm* — Joseph V. Bonadies

(57) ABSTRACT

A guidance system, for use on an automated vehicle includes a camera, a vehicle-to-vehicle transceiver, and a controller. The camera detects a lane-marking on a roadway and detects a lead-vehicle traveling ahead of a host-vehicle. The vehicle-to-vehicle transceiver receives a future-waypoint from the lead-vehicle, wherein the future-waypoint defines a future-route of the lead-vehicle along the roadway. The controller is in communication with the camera and the vehicle-to-vehicle transceiver. The controller determines a projected-path for the host-vehicle based on the lane-marking. The controller also determines a lead-path of the lead-vehicle based on the camera. The controller steers the host-vehicle according to the lead-path when the lane-marking is not detected and the lead-path corresponds to the projected-path. The controller steers the host-vehicle according to the projected-path while the lane-marking is not detected and the future-waypoint does not correspond to the projected-path.

23 Claims, 7 Drawing Sheets

US 10,466,706 B2

AUTOMATED GUIDANCE SYSTEM

TECHNICAL FIELD OF INVENTION

This disclosure generally relates to an automated guidance system and more particularly relates to an automated guidance system that steers a host-vehicle according to a projected-path.

BACKGROUND OF INVENTION

It is known to use a lane-centering control system to steer a host-vehicle along a roadway. The typical lane-centering control system uses a camera to detect a lane-marking to determine a centerline of the roadway and steers the host-vehicle according to the centerline. Other lane-centering control systems may also use the camera to detect an other-vehicle ahead of the host-vehicle and follow the other-vehicle when the lane-marking is not detected. A problem may occur when the other-vehicle diverges from the desired travel-route of the host-vehicle.

SUMMARY OF THE INVENTION

In accordance with one embodiment, a guidance system for use on an automated vehicle is provided. The guidance system, includes a camera, a vehicle-to-vehicle transceiver, and a controller. The camera detects a lane-marking on a roadway and detects a lead-vehicle traveling ahead of a host-vehicle. The vehicle-to-vehicle transceiver receives a future-waypoint from the lead-vehicle, wherein the future-waypoint defines a future-route of the lead-vehicle along the roadway. The controller is in communication with the camera and the vehicle-to-vehicle transceiver. The controller determines a projected-path for the host-vehicle based on the lane-marking. The controller also determines a lead-path of the lead-vehicle based on the camera. The controller steers the host-vehicle according to the lead-path when the lane-marking is not detected and the lead-path corresponds to the projected-path. The controller steers the host-vehicle according to the projected-path while the lane-marking is not detected and the future-waypoint does not correspond to the projected-path.

In another embodiment, a method of operating a guidance system for use on an automated vehicle is provided. The method includes the steps of detecting a lane-marking, receiving a future-waypoint, determining a projected-path, determining a lead-path, and steering a host-vehicle. The step of detecting the lane-marking includes detecting, with a camera, a lane-marking on a roadway and a lead-vehicle traveling ahead of a host-vehicle. The step of receiving the future-waypoint includes receiving, with a vehicle-to-vehicle transceiver, a future-waypoint from the lead-vehicle, wherein the future-waypoint defines a future-route of the lead-vehicle along the roadway. The step of determining the projected-path includes determining, with a controller in communication with the camera and the vehicle-to-vehicle transceiver, a projected-path for the host-vehicle based on the lane-marking. The step of determining the lead-path includes determining, with the controller, the lead-path of the lead-vehicle based on the camera. The step of steering the host-vehicle includes steering, with the controller, the host-vehicle according to the lead-path when the lane-marking is not detected and the lead-path corresponds to the projected-path, and steering the host-vehicle according to the projected-path while the lane-marking is not detected and the future-waypoint does not correspond to the projected-path.

In yet another embodiment, a guidance system for use on an automated vehicle is provided. The guidance system includes an object-detector, a vehicle-to-vehicle transceiver, and a controller. The object-detector detects a lane-marking on a roadway traveled by a host-vehicle and a lead-vehicle traveling ahead of the host-vehicle. The vehicle-to-vehicle transceiver receives a future-waypoint from the lead-vehicle, wherein the future-waypoint indicates a future-route of the lead-vehicle. The controller is in communication with the object-detector and the vehicle-to-vehicle transceiver. The controller determines a travel-path for the host-vehicle based on the lane-marking, and follows the lead-vehicle when the future-waypoint coincides with the travel-path.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
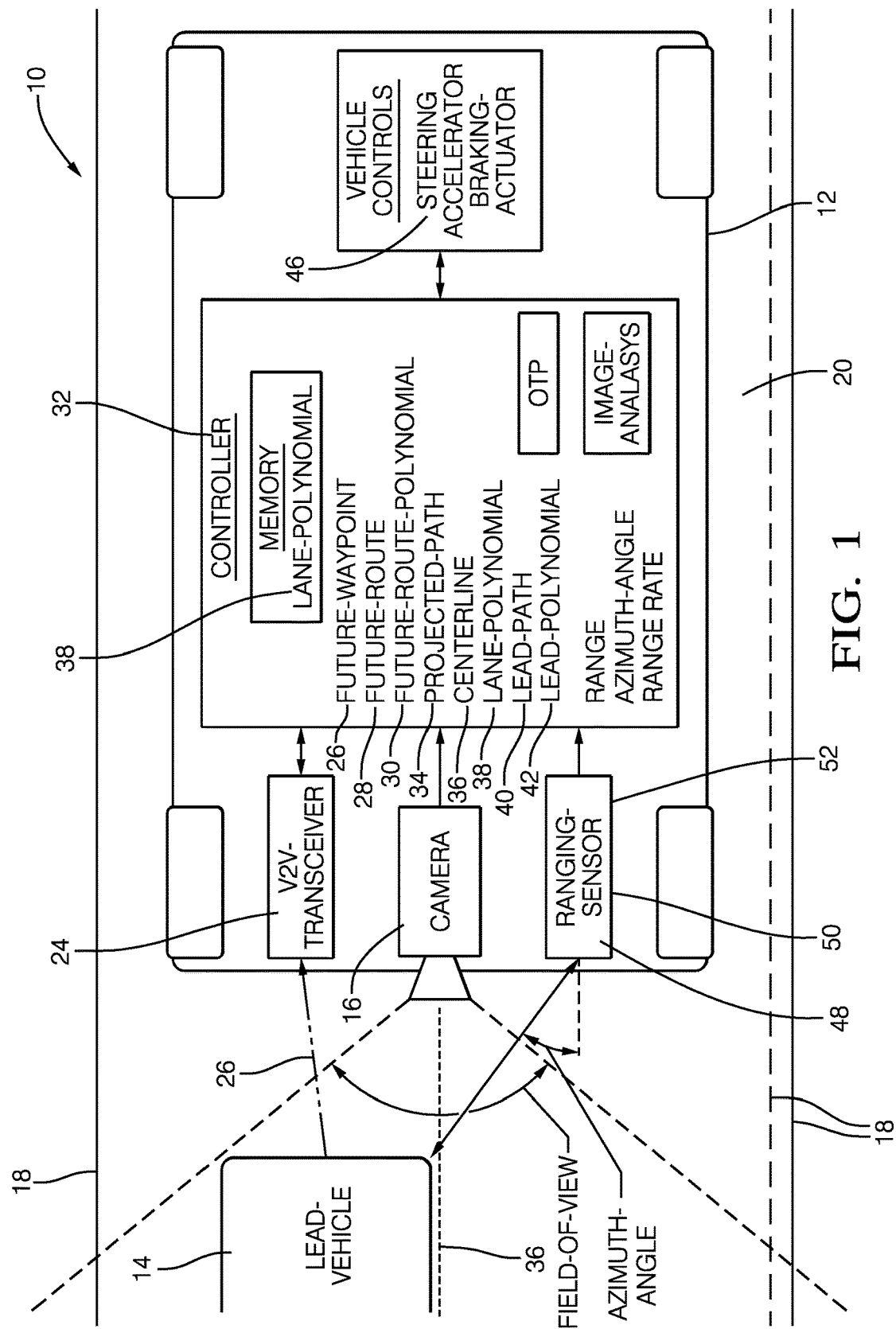
FIG. 1 is an illustration of a guidance system in accordance with one embodiment.

FIG. 1 illustrates a non-limiting example of a guidance system 10, hereafter referred to as the system 10, for use on an automated vehicle 12, hereafter referred to as a host-vehicle 12. As will be described in more detail below, the system 10 is an improvement over prior guidance systems because the system 10 determines when to follow a lead-vehicle 14 based on a vehicle-to-vehicle (V2V) communication. As used herein, the term 'automated vehicle' is not meant to suggest that fully automated or autonomous operation of the host-vehicle 12 is required. It is contemplated that the teachings presented herein are applicable to instances where the host-vehicle 12 is entirely manually operated by a human and the automation is merely providing assistance to the human, and possibly operating the brakes and steering of the host-vehicle 12 to prevent the host-vehicle 12 from colliding with an other-vehicle, or providing assistance to the operator for lane-keeping.

The system 10 includes a camera 16 that detects a lane-marking 18 on a roadway 20 and detects the lead-vehicle 14 traveling ahead of the host-vehicle 12. Examples of the camera 16 suitable for use on the host-vehicle 12 are commercially available as will be recognized by those in the art, one such being the APTINA MT9V023 from Micron Technology, Inc. of Boise, Id., USA. The camera 16 may be mounted on the front of the host-vehicle 12, or mounted in the interior of the host-vehicle 12 at a location suitable for the camera 16 to view the area around the host-vehicle 12 through the windshield of the host-vehicle 12. The camera 16 is preferably a video-type camera 16 or camera 16 that can capture images of the roadway 20 and surrounding area at a sufficient frame-rate, of ten frames per second, for example. The roadway 20 may be defined by the lane-marking 18, or may be defined by edges of pavement if no lane-marking 18 is detected. The image may include, but is not limited to, the lane-marking 18 on a left-side and a right-side of the roadway 20 traveled by the host-vehicle 12. The image may also include the lane-marking 18 in an adjacent-lane 22 (see FIG. 3). The lane-marking 18 may include a solid-line, a dashed-line, or any combination thereof.

The system 10 also includes a vehicle-to-vehicle transceiver 24 (V2V-transceiver 24) that receives a future-waypoint 26 from the lead-vehicle 14, wherein the future-waypoint 26 defines a future-route 28 of the lead-vehicle 14 along the roadway 20. The lead-vehicle 14 may be operating autonomously and may be navigating according to the future-route 28. The V2V-transceiver 24 may be a dedicated short range communication (DSRC) device that operates in a 5.9 GHz band with a bandwidth of 75 MHz and a typical range of 1000 meters. One skilled in the art will recognize that other ad hoc V2V networks may exist, and are included herein. The future-waypoint 26 may include a series of GPS coordinates (e.g. longitude and latitude) along the roadway 20 that define the future-route 28 of the lead-vehicle 14. The future-waypoint 26 may be characterized by a future-route-polynomial 30 based on the future-route 28. The future-route 28 may indicate that the lead-vehicle 14 will perform a particular driving maneuver, including, but not limited to, a lane-change, a left-turn, a right-turn, etc. The future-route 28 may also include a destination of the lead-vehicle 14.

The system 10 also includes a controller 32 in communication with the camera 16 and the V2V-transceiver 24. The controller 32 may include a processor (not shown) such as a microprocessor or other control circuitry such as analog and/or digital control circuitry including an application specific integrated circuit (ASIC) for processing data as should be evident to those in the art. The controller 32 may include a memory (not specifically shown), including non-volatile memory, such as electrically erasable programmable read-only memory (EEPROM) for storing one or more routines, thresholds, and captured data. The one or more routines may be executed by the processor to perform steps for determining a projected-path 34 of the host-vehicle 12 based on signals received by the controller 32 from the camera 16 and the V2V-transceiver 24 as described herein.

The controller 32 may receive the image from the camera 16, via a video-signal (not specifically shown), and may determine both a lane-width (not specifically shown) and a centerline 36 of the roadway 20 based on the lane-marking 18. That is, the image detected or captured by the camera 16 is processed by the controller 32 using known techniques for image-analysis to determine where along the roadway 20 the host-vehicle 12 should be operated. Vision processing technologies, such as the EYE Q® platform from Mobileye Vision Technologies, Ltd. of Jerusalem, Israel, or other suitable devices may be used. By way of example and not limitation, the centerline 36 is preferably in the middle of the roadway 20 traveled by the host-vehicle 12, and the projected-path 34 preferably follows the centerline 36. The projected-path 34 may be characterized by a lane-polynomial 38 based on the lane-marking 18 and may be stored in the memory of the controller 32. The controller 32 preferably uses the lane-marking 18 on both the left-side and right-side of the roadway 20 to determine the projected-path 34, or may use only one lane-marking 18 to determine the projected-path 34 if a confidence level associated with one instance of the lane-marking 18 is sufficiently high to generate the lane-polynomial 38, as will be understood by those skilled in the art. If no lane-marking 18 is detected, the controller 32 may hand-off the control of the host-vehicle 12 to an operator (not shown) with sufficient notice of the hand-off, although this is not the preferred response to the situation when no instance of the lane-marking 18 is detected. The preferred response will be described in detail below.

Figure 2:
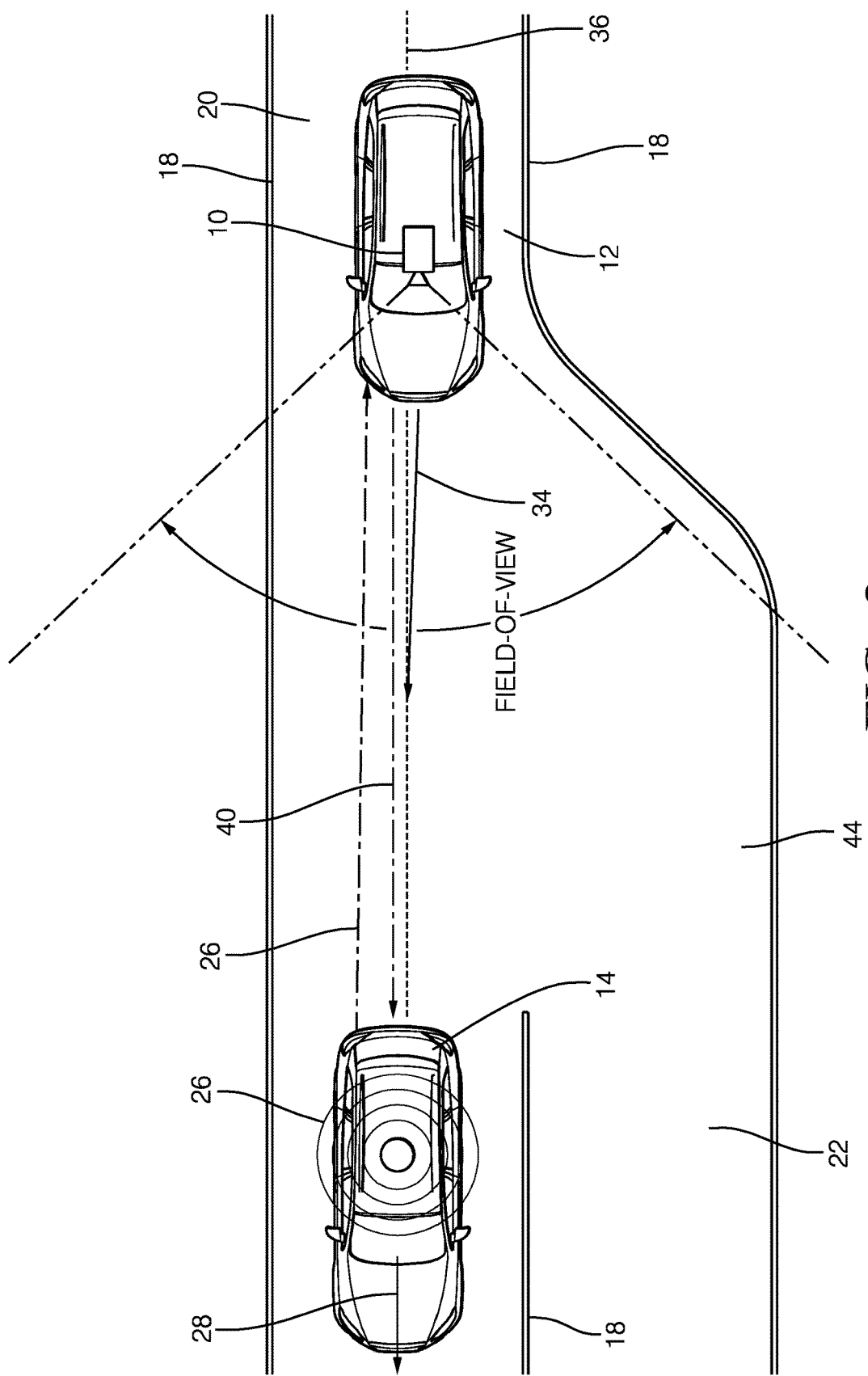
FIG. 2 is an illustration of a host-vehicle equipped with the guidance system of FIG. 1 in accordance with one embodiment.

FIG. 2 illustrates a traffic scenario where the host-vehicle 12 is following the lead-vehicle 14 on the roadway 20 where a section of the lane-marking 18 on the left-side of the roadway 20 is not-detected (i.e. missing, occluded, faded, etc.). In the non-limiting example illustrated in FIG. 2, the lead-vehicle 14 is operating autonomously and is navigating according to the future-route 28 while transmitting the future-waypoint 26. The controller 32 determines the projected-path 34 for the host-vehicle 12 based on the detected lane-marking 18 as described above, and determines a lead-path 40 of the lead-vehicle 14 based on the camera 16. The lead-path 40 may be determined using the known methods of object-trail-processing (OTP), where a primary-object (i.e. the lead-vehicle 14) is detected by the camera 16 and processed by the image-analysis software to determine a trail of the primary-object. The lead-path 40 may be characterized by a lead-polynomial 42 based on the lead-vehicle 14. When the lane-marking 18 is not detected, as illustrated in FIG. 2, the controller 32 may use the lead-path 40 to determine the projected-path 34 of the host-vehicle 12. The controller 32 may preferably use the lane-marking 18 that is detected, e.g. on the right-side of the roadway 20 as illustrated in FIG. 2, along with the lead-path 40 to determine the projected-path 34. The controller 32 may also use the lane-polynomial 38 that is stored in the memory, on a temporary basis, along with the lead-path 40 to determine the projected-path 34 if no lane-marking 18 is detected. The controller 32 steers 46 the host-vehicle 12 according to the lead-path 40 when the lane-marking 18 is not detected and the lead-path 40 corresponds to the projected-path 34. That is, an action that is preferable to handing over control of the host-vehicle 12 to the operator when the lane-marking 18 is not detected, is for the controller 32 to give a higher-priority to the lead-path 40 compared to the projected-path 34 and controls the host-vehicle 12 to follow the lead-vehicle 14, with a condition that the lead-path 40 corresponds to the projected-path 34 of the host-vehicle 12.

Figure 3:
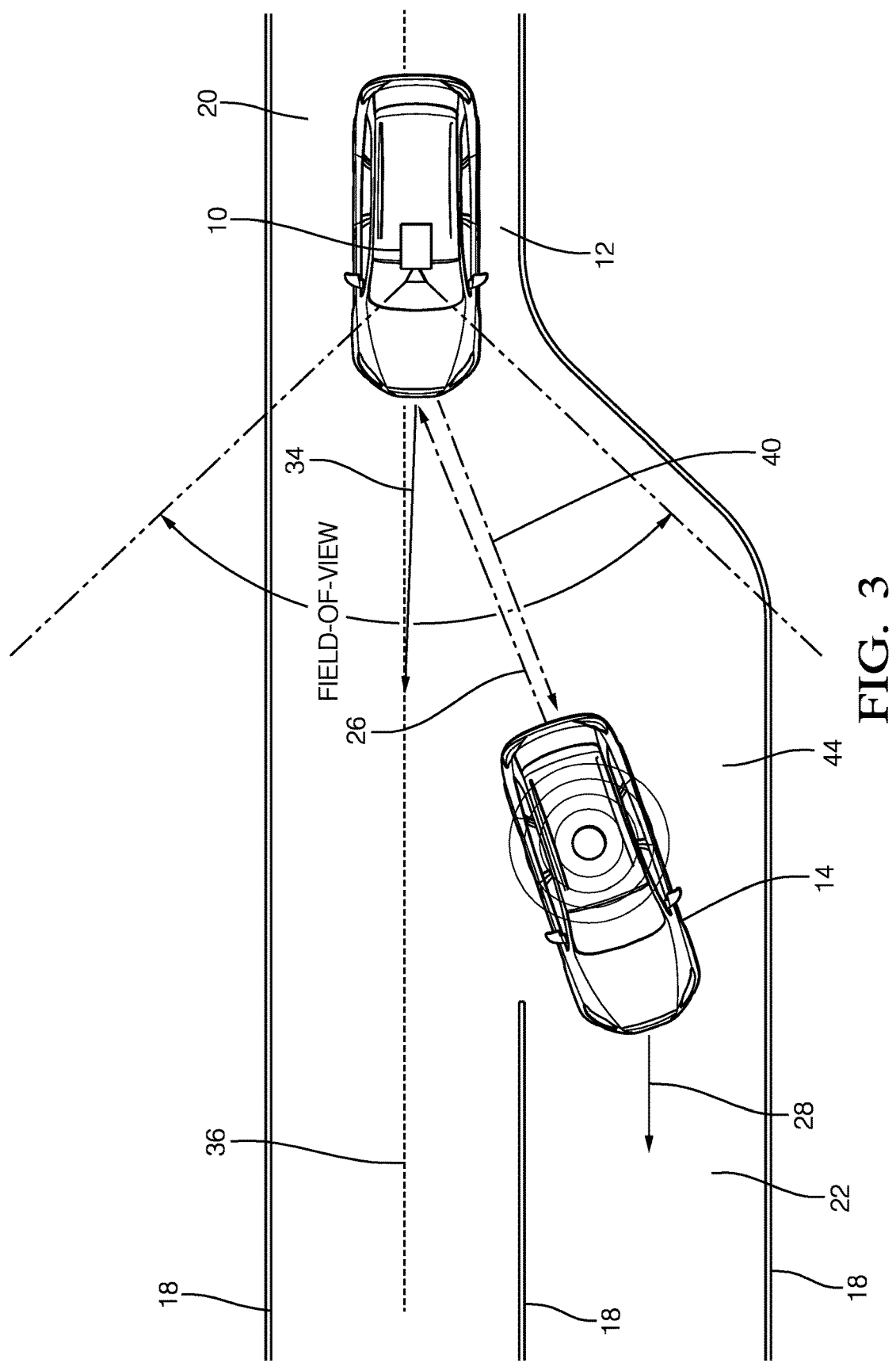
FIG. 3 is an illustration of the host-vehicle of FIG. 2 in accordance with one embodiment.

FIG. 3 illustrates another traffic scenario where the lead-vehicle 14 is moving into a left-turn-lane 44 where the lane-marking 18 is temporarily discontinued and is not detected by the camera 16. In the non-limiting example illustrated in FIG. 3, the lead-vehicle 14 is operating autonomously and is navigating according to the future-route 28 while transmitting the future-waypoint 26. It has been observed that some automated vehicle systems undesirably follow the lead-vehicle 14 into the adjacent-lane 22. The controller 32 steers 46 the host-vehicle 12 according to the projected-path 34 while the lane-marking 18 is not detected and the future-waypoint 26 does not correspond to the projected-path 34. That is, when the future-waypoint 26 is indicative of a deviation from the projected-path 34, as when the lead-vehicle 14 is moving into the left-turn-lane 44 illustrated in FIG. 3, the controller 32 gives the higher-priority to the projected-path 34 and ignores the lead-path 40. In other words, the host-vehicle 12 does not follow the lead-vehicle 14 when the V2V transmission broadcast by the lead-vehicle 14 indicates the lead-vehicle 14 is going to follow a different lane. This is beneficial because the system 10 prevents the host-vehicle 12 from temporarily following the lead-vehicle 14 into the left-turn-lane 44 before the detection of the lane-marking 18 can be reestablished by the camera 16.

While FIG. 3 illustrates the future-waypoint 26 includes travel into the left-turn-lane 44, it will be understood that the system 10 functions when the lead-vehicle 14 indicates travel into a right-turn-lane (not shown).

The system 10 may further include a ranging-sensor 48, in communication with the controller 32, that may detect the lead-vehicle 14 on the roadway 20 ahead of the host-vehicle 12. The controller 32 may further determine the lead-path 40 based on the ranging-sensor 48. The ranging-sensor 48 may include a radar 50 and/or a lidar 52, as will be understood by one skilled in the art. Examples of the radar 50 suitable to detect the lead-vehicle 14 is an Electronically Scanning Radar (ESR) or a Rear-Side-Detection-System (RSDS), or a Short-Range-Radar (SRR) available from Delphi Inc. of Troy, Mich., USA.

Figure 4:
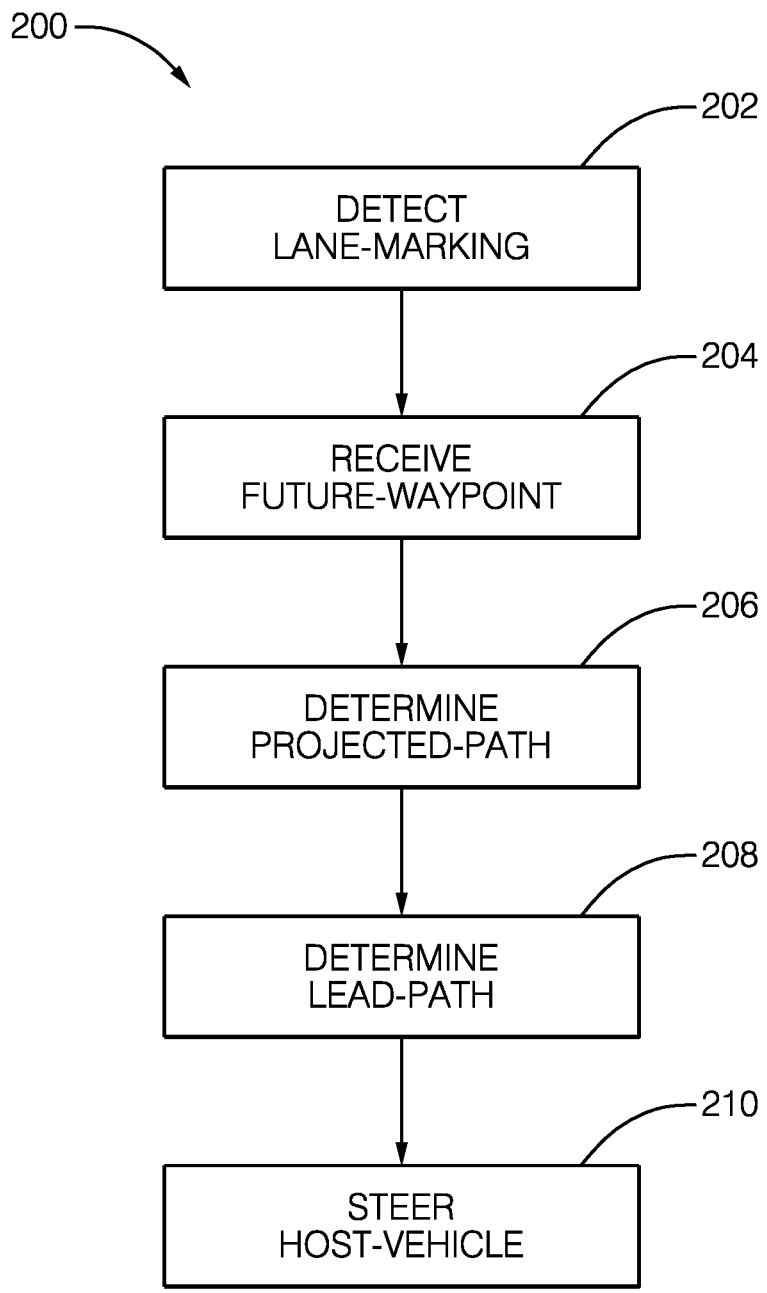
FIG. 4 is a flow-chart of a method of operating the guidance system of FIG. 1 in accordance with another embodiment.

FIG. 4 illustrates a non-limiting example of a method 200 of operating a guidance system 10, hereafter referred to as the system 10, for use on an automated vehicle 12, hereafter referred to as a host-vehicle 12.

Step 202, DETECT LANE-MARKING, may include detecting, with a camera 16 a lane-marking 18 on a roadway 20 and detecting a lead-vehicle 14 traveling ahead of the host-vehicle 12. Examples of the camera 16 suitable for use on the host-vehicle 12 are commercially available as will be recognized by those in the art, one such being the APTINA MT9V023 from Micron Technology, Inc. of Boise, Id., USA. The camera 16 may be mounted on the front of the host-vehicle 12, or mounted in the interior of the host-vehicle 12 at a location suitable for the camera 16 to view the area around the host-vehicle 12 through the windshield of the host-vehicle 12. The camera 16 is preferably a video-type camera 16 or camera 16 that can capture images of the roadway 20 and surrounding area at a sufficient frame-rate, of ten frames per second, for example. The roadway 20 may be defined by the lane-marking 18, or may be defined by edges of pavement if no lane-marking 18 is detected. The image may include, but is not limited to, the lane-marking 18 on a left-side and a right-side of the roadway 20 traveled by the host-vehicle 12. The image may also include the lane-marking 18 in an adjacent-lane 22 (see FIG. 3). The lane-marking 18 may include a solid-line, a dashed-line, or any combination thereof.

Step 204, RECEIVE FUTURE-WAYPOINT, may include receiving, with a vehicle-to-vehicle transceiver 24 (V2V-transceiver 24), a future-waypoint 26 from the lead-vehicle 14, wherein the future-waypoint 26 defines a future-route 28 of the lead-vehicle 14 along the roadway 20. The lead-vehicle 14 may be operating autonomously and may be navigating according to the future-route 28. The V2V-transceiver 24 may be a dedicated short range communication (DSRC) device that operates in a 5.9 GHz band with a bandwidth of 75 MHz and a typical range of 1000 meters. One skilled in the art will recognize that other ad hoc V2V networks may exist, and are included herein. The future-waypoint 26 may include a series of GPS coordinates (e.g. longitude and latitude) along the roadway 20 that define the future-route 28 of the lead-vehicle 14. The future-waypoint 26 may be characterized by a future-route-polynomial 30 based on the future-route 28. The future-route 28 may indicate that the lead-vehicle 14 will perform a particular driving maneuver, including, but not limited to, a lane-change, a left-turn, a right-turn, etc. The future-route 28 may also include a destination of the lead-vehicle 14.

Step 206, DETERMINE PROJECTED-PATH, may include determining, with a controller 32 in communication with the camera 16 and the V2V-transceiver 24, a projected-path 34 for the host-vehicle 12 based on the lane-marking 18. The controller 32 may include a processor (not shown) such as a microprocessor or other control circuitry such as analog and/or digital control circuitry including an application specific integrated circuit (ASIC) for processing data as should be evident to those in the art. The controller 32 may include a memory (not specifically shown), including non-volatile memory, such as electrically erasable programmable read-only memory (EEPROM) for storing one or more routines, thresholds, and captured data. The one or more routines may be executed by the processor to perform steps for determining a projected-path 34 of the host-vehicle 12 based on signals received by the controller 32 from the camera 16 and the V2V-transceiver 24 as described herein.

The controller 32 may receive the image from the camera 16, via a video-signal (not specifically shown), and may determine both a lane-width (not specifically shown) and a centerline 36 of the roadway 20 based on the lane-marking 18. That is, the image detected or captured by the camera 16 is processed by the controller 32 using known techniques for image-analysis to determine where along the roadway 20 the host-vehicle 12 should be operated. Vision processing technologies, such as the EYE Q® platform from Moblieye Vision Technologies, Ltd. of Jerusalem, Israel, or other suitable devices may be used. By way of example and not limitation, the centerline 36 is preferably in the middle of the roadway 20 traveled by the host-vehicle 12, and the projected-path 34 preferably follows the centerline 36. The projected-path 34 may be characterized by a lane-polynomial 38 based on the lane-marking 18 and may be stored in the memory of the controller 32. The controller 32 preferably uses the lane-marking 18 on both the left-side and right-side of the roadway 20 to determine the projected-path 34, or may use only one lane-marking 18 to determine the projected-path 34 if a confidence level associated with one instance of the lane-marking 18 is sufficiently high to generate the lane-polynomial 38, as will be understood by those skilled in the art. If no lane-marking 18 is detected, the controller 32 may hand-off the control of the host-vehicle 12 to an operator (not shown) with sufficient notice of the hand-off, although this is not the preferred response to the situation when no instance of the lane-marking 18 is detected. The preferred response will be described in detail below.

Step 208, DETERMINE LEAD-PATH, may include determining, with the controller 32, a lead-path 40 of the lead-vehicle 14 based on the camera 16. FIG. 2 illustrates a traffic scenario where the host-vehicle 12 is following the lead-vehicle 14 on the roadway 20 where a section of the lane-marking 18 on the left-side of the roadway 20 is not-detected (i.e. missing, occluded, faded, etc.). In the non-limiting example illustrated in FIG. 2, the lead-vehicle 14 is operating autonomously and is navigating according to the future-route 28 while transmitting the future-waypoint 26. The controller 32 determines the projected-path 34 for the host-vehicle 12 based on the detected lane-marking 18 as described above, and determines a lead-path 40 of the lead-vehicle 14 based on the camera 16. The lead-path 40 may be determined using the known methods of object-trail-processing (OTP), where a primary-object (i.e. the lead-vehicle 14) is detected by the camera 16 and processed by the image-analysis software to determine a trail of the primary-object. The lead-path 40 may be characterized by a lead-polynomial 42 based on the lead-vehicle 14. When the lane-marking 18 is not detected, as illustrated in FIG. 2, the controller 32 may use the lead-path 40 to determine the projected-path 34 of the host-vehicle 12. The controller 32 may preferably use the lane-marking 18 that is detected, e.g. on the right-side of the roadway 20 as illustrated in FIG. 2, along with the lead-path 40 to determine the projected-path 34. The controller 32 may also use the lane-polynomial 38 that is stored in the memory, on a temporary basis, along with the lead-path 40 to determine the projected-path 34 if no lane-marking 18 is detected.

Step 210, STEER HOST-VEHICLE, may include steering 46, with the controller 32, the host-vehicle 12 according to the lead-path 40 when the lane-marking 18 is not detected and the lead-path 40 corresponds to the projected-path 34. That is, an action that is preferable to handing over control of the host-vehicle 12 to the operator when the lane-marking 18 is not detected, is for the controller 32 to give a higher-priority to the lead-path 40 compared to the projected-path 34 and controls the host-vehicle 12 to follow the lead-vehicle 14, with a condition that the lead-path 40 corresponds to the projected-path 34 of the host-vehicle 12.

FIG. 3 illustrates another traffic scenario where the lead-vehicle 14 is moving into a left-turn-lane 44 where the lane-marking 18 is temporarily discontinued and is not detected by the camera 16. In the non-limiting example illustrated in FIG. 3, the lead-vehicle 14 is operating autonomously and is navigating according to the future-route 28 while transmitting the future-waypoint 26. It has been observed that some automated vehicle systems undesirably follow the lead-vehicle 14 into the adjacent-lane 22. The controller 32 steers 46 the host-vehicle 12 according to the projected-path 34 while the lane-marking 18 is not detected and the future-waypoint 26 does not correspond to the projected-path 34. That is, when the future-waypoint 26 is indicative of a deviation from the projected-path 34, as when the lead-vehicle 14 is moving into the left-turn-lane 44 illustrated in FIG. 3, the controller 32 gives the higher-priority to the projected-path 34 and ignores the lead-path 40. In other words, the host-vehicle 12 does not follow the lead-vehicle 14 when the V2V transmission broadcast by the lead-vehicle 14 indicates the lead-vehicle 14 is going to follow a different lane. This is beneficial because the system 10 prevents the host-vehicle 12 from temporarily following the lead-vehicle 14 into the left-turn-lane 44 before the detection of the lane-marking 18 can be reestablished by the camera 16.

While FIG. 3 illustrates the future-waypoint 26 includes travel into the left-turn-lane 44, it will be understood that the system 10 functions when the lead-vehicle 14 indicates travel into a right-turn-lane (not shown).

Figure 5:
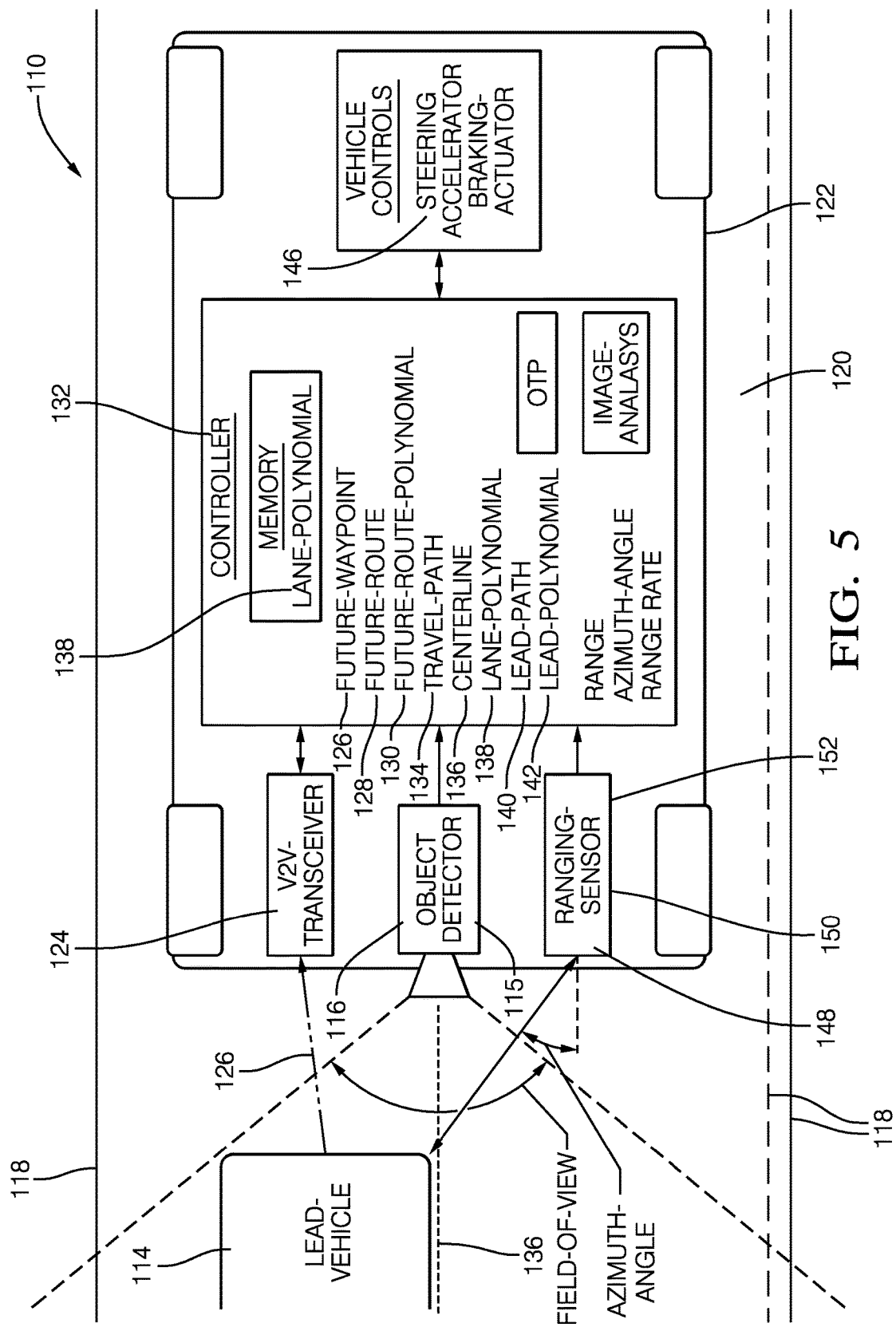
FIG. 5 is an illustration of a guidance system in accordance with yet another embodiment.

FIG. 5 illustrates an non-limiting example of yet another embodiment of a guidance system 110, hereafter referred to as the system 110, for use on an automated vehicle 112, hereafter referred to as a host-vehicle 112. As will be described in more detail below, the system 110 is an improvement over prior guidance systems because the system 110 determines when to follow a lead-vehicle 114 based on a vehicle-to-vehicle (V2V) communication. As used herein, the term 'automated vehicle' is not meant to suggest that fully automated or autonomous operation of the host-vehicle 112 is required. It is contemplated that the teachings presented herein are applicable to instances where the host-vehicle 112 is entirely manually operated by a human and the automation is merely providing assistance to the human, and possibly operating the brakes and steering of the host-vehicle 112 to prevent the host-vehicle 112 from colliding with an other-vehicle, or providing assistance to the operator for lane-keeping.

The system 110 includes an object-detector 115 that detects a lane-marking 118 on a roadway 120 traveled by the host-vehicle 112 and a lead-vehicle 114 traveling ahead of the host-vehicle 112. In the non-limiting example illustrated in FIG. 5, the object-detector 115 is a camera 116. Examples of the camera 116 suitable for use on the host-vehicle 112 are commercially available as will be recognized by those in the art, one such being the APTINA MT9V023 from Micron Technology, Inc. of Boise, Id., USA. The camera 116 may be mounted on the front of the host-vehicle 112, or mounted in the interior of the host-vehicle 112 at a location suitable for the camera 116 to view the area around the host-vehicle 112 through the windshield of the host-vehicle 112. The camera 116 is preferably a video-type camera 116 or camera 116 that can capture images of the roadway 120 and surrounding area at a sufficient frame-rate, of ten frames per second, for example. The roadway 120 may be defined by the lane-marking 118, or may be defined by edges of pavement if no lane-marking 118 is detected. The image may include, but is not limited to, the lane-marking 118 on a left-side and a right-side of the roadway 120 traveled by the host-vehicle 112. The image may also include the lane-marking 118 in an adjacent-lane 122 (see FIG. 7). The lane-marking 118 may include a solid-line, a dashed-line, or any combination thereof.

The system 110 also includes a vehicle-to-vehicle transceiver 124 (V2V-transceiver 124) that receives a future-waypoint 126 from the lead-vehicle 114, wherein the future-waypoint 126 defines a future-route 128 of the lead-vehicle 114 along the roadway 120. The lead-vehicle 114 may be operating autonomously and may be navigating according to the future-route 128. The V2V-transceiver 124 may be a dedicated short range communication (DSRC) device that operates in a 5.9 GHz band with a bandwidth of 75 MHz and a typical range of 1000 meters. One skilled in the art will recognize that other ad hoc V2V networks may exist, and are included herein. The future-waypoint 126 may include a series of GPS coordinates (e.g. longitude and latitude) along the roadway 120 that define the future-route 128 of the lead-vehicle 114. The future-waypoint 126 may be characterized by a future-route-polynomial 130 based on the future-route 128. The future-route 128 may indicate that the lead-vehicle 114 will perform a particular driving maneuver, including, but not limited to, a lane-change, a left-turn, a right-turn, etc. The future-route 128 may also include a destination of the lead-vehicle 114.

The system 110 also includes a controller 132 in communication with the object-detector 115 (i.e. the camera 116) and the V2V-transceiver 124. The controller 132 may include a processor (not shown) such as a microprocessor or other control circuitry such as analog and/or digital control circuitry including an application specific integrated circuit (ASIC) for processing data as should be evident to those in the art. The controller 132 may include a memory (not specifically shown), including non-volatile memory, such as electrically erasable programmable read-only memory (EEPROM) for storing one or more routines, thresholds, and captured data. The one or more routines may be executed by the processor to perform steps for determining a travel-path 134 of the host-vehicle 112 based on signals received by the controller 132 from the object-detector 115 and the V2V-transceiver 124 as described herein.

The controller 132 may receive the image from the camera 116 (i.e. the object-detector 115), via a video-signal (not specifically shown), and may determine both a lane-width (not specifically shown) and a centerline 136 of the roadway 120 based on the lane-marking 118. That is, the image detected or captured by the camera 116 is processed by the controller 132 using known techniques for image-analysis to determine where along the roadway 120 the host-vehicle 112 should be operated. Vision processing technologies, such as the EYE Q® platform from Moblieye Vision Technologies, Ltd. of Jerusalem, Israel, or other suitable devices may be used. By way of example and not limitation, the centerline 136 is preferably in the middle of the roadway 120 traveled by the host-vehicle 112, and the travel-path 134 preferably follows the centerline 136. The travel-path 134 may be characterized by a lane-polynomial 138 based on the lane-marking 118 and may be stored in the memory of the controller 132. The controller 132 preferably uses the lane-marking 118 on both the left-side and right-side of the roadway 120 to determine the travel-path 134, or may use only one lane-marking 118 to determine the travel-path 134 if a confidence level associated with one instance of the lane-marking 118 is sufficiently high to generate the lane-polynomial 138, as will be understood by those skilled in the art. If no lane-marking 118 is detected, the controller 132 may hand-off the control of the host-vehicle 112 to an operator (not shown) with sufficient notice of the hand-off, although this is not the preferred response to the situation when no instance of the lane-marking 118 is detected. The preferred response will be described in detail below.

Figure 6:
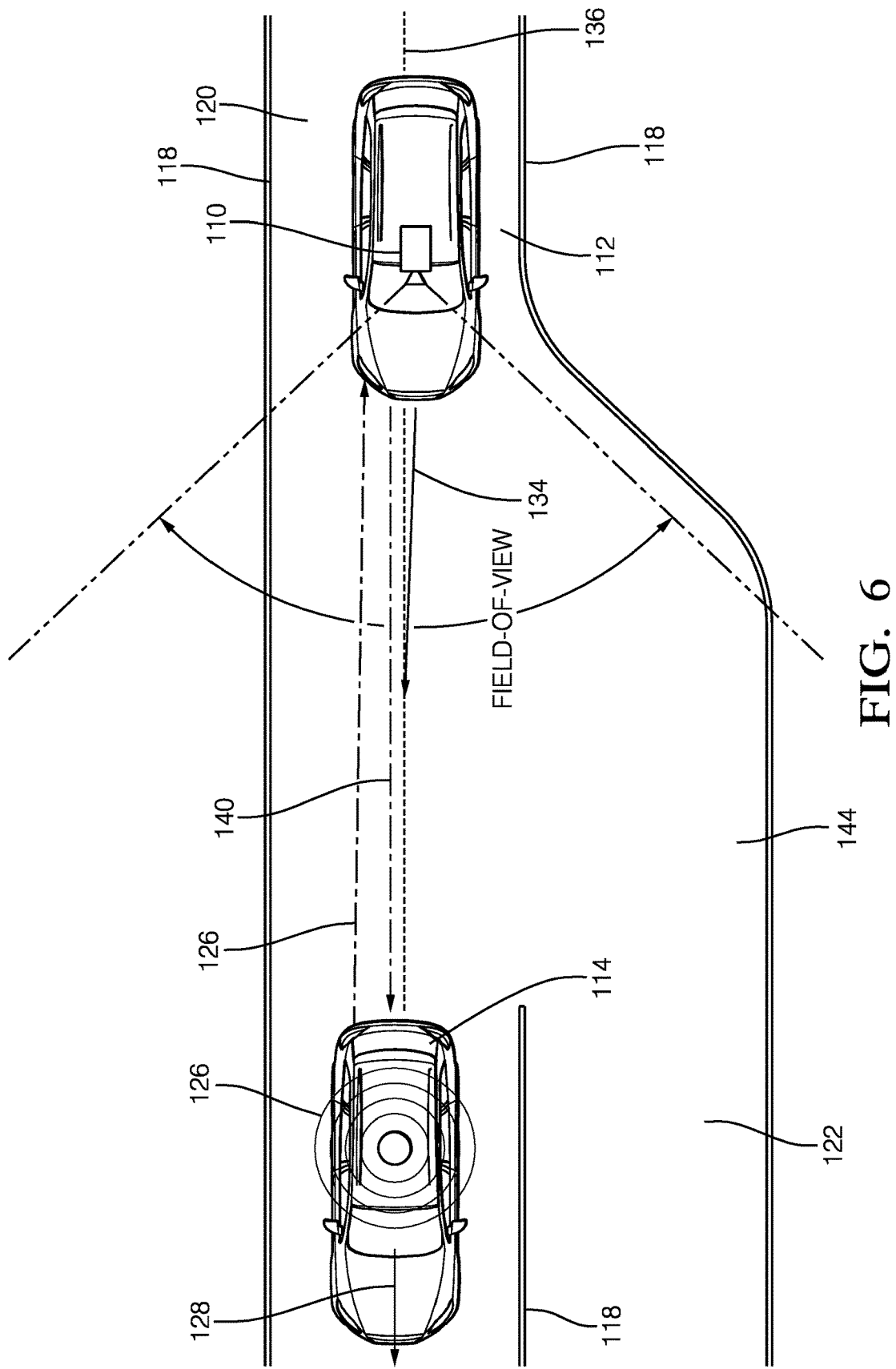
FIG. 6 is an illustration of a host-vehicle equipped with the guidance system of FIG. 5 in accordance with yet another embodiment.

FIG. 6 illustrates a traffic scenario where the host-vehicle 112 is following the lead-vehicle 114 on the roadway 120 where a section of the lane-marking 118 on the left-side of the roadway 120 is not-detected (i.e. missing, occluded, faded, etc.). In the non-limiting example illustrated in FIG. 6, the lead-vehicle 114 is operating autonomously and is navigating according to the future-route 128 while transmitting the future-waypoint 126. The controller 132 determines the travel-path 134 for the host-vehicle 112 based on the detected lane-marking 118 as described above, and determines a lead-path 140 of the lead-vehicle 114 based on the camera 116. The lead-path 140 may be determined using the known methods of object-trail-processing (OTP), where a primary-object (i.e. the lead-vehicle 114) is detected by the camera 116 and processed by the image-analysis software to determine a trail of the primary-object. The lead-path 140 may be characterized by a lead-polynomial 142 based on the lead-vehicle 114. When the lane-marking 118 is not detected, as illustrated in FIG. 6, the controller 132 may use the lead-path 140 to determine the travel-path 134 of the host-vehicle 112. The controller 132 may preferably use the lane-marking 118 that is detected, e.g. on the right-side of the roadway 120 as illustrated in FIG. 6, along with the lead-path 140 to determine the travel-path 134. The controller 132 may also use the lane-polynomial 138 that is stored in the memory, on a temporary basis, along with the lead-path 140 to determine the travel-path 134 if no lane-marking 118 is detected. The controller 132 steers 146 the host-vehicle 112 according to the lead-path 140 when the lane-marking 118 is not detected and the lead-path 140 coincides with the travel-path 134. That is, an action that is preferable to handing over control of the host-vehicle 112 to the operator when the lane-marking 118 is not detected, is for the controller 132 to give a higher-priority to the lead-path 140 compared to the travel-path 134 and controls the host-vehicle 112 to follow the lead-vehicle 114, with a condition that the lead-path 140 coincides with the travel-path 134 of the host-vehicle 112.

Figure 7:
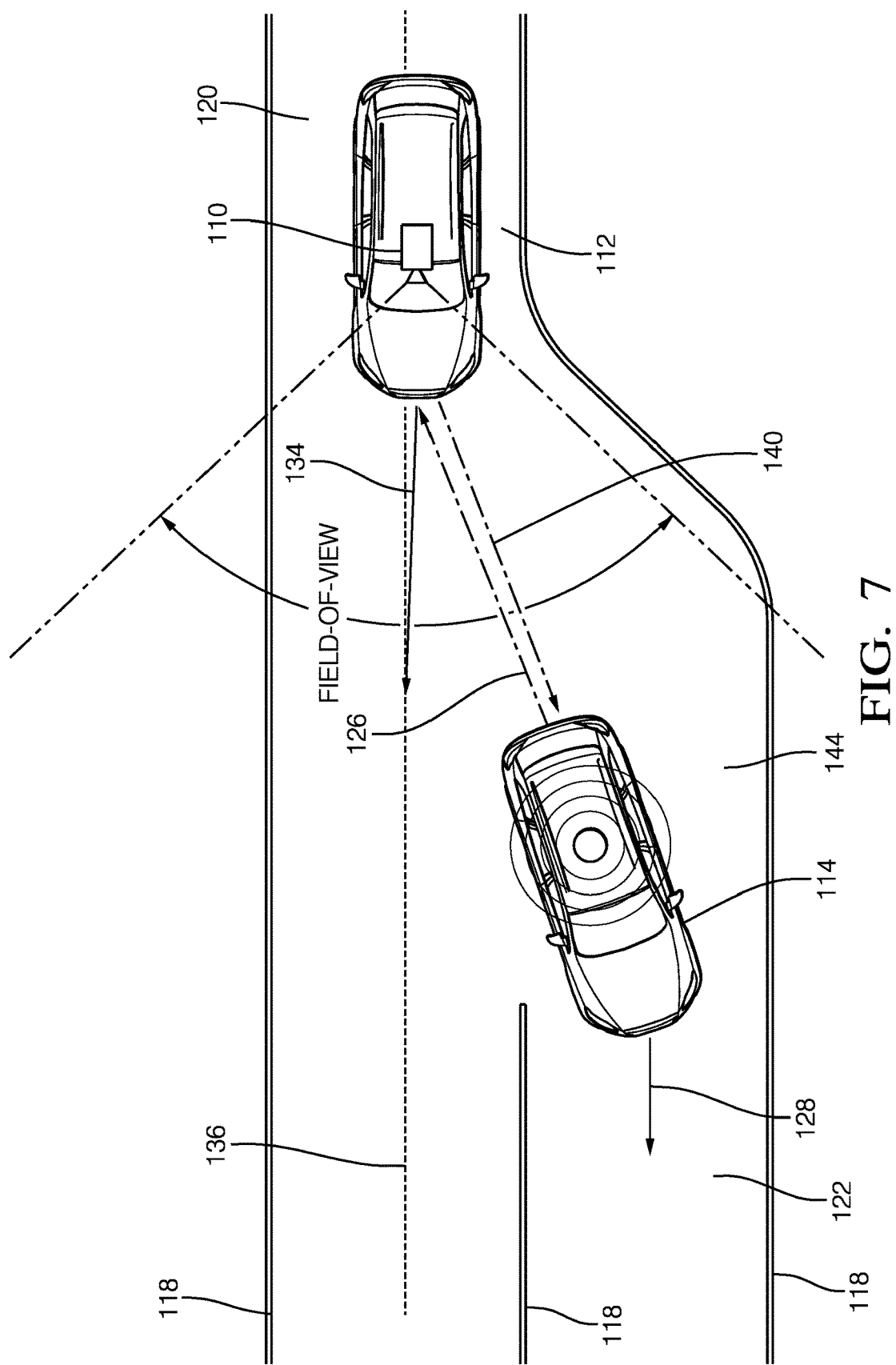
FIG. 7 is an illustration of the host-vehicle of FIG. 5 in accordance with yet another embodiment.

FIG. 7 illustrates another traffic scenario where the lead-vehicle 114 is moving into a left-turn-lane 144 where the lane-marking 118 is temporarily discontinued and is not detected by the camera 116. In the non-limiting example illustrated in FIG. 7, the lead-vehicle 114 is operating autonomously and is navigating according to the future-route 128 while transmitting the future-waypoint 126. It has been observed that some automated vehicle systems undesirably follow the lead-vehicle 114 into the adjacent-lane 122. The controller 132 steers 146 the host-vehicle 112 according to the travel-path 134 while the lane-marking 118 is not detected and the future-waypoint 126 does not correspond to the travel-path 134. That is, when the future-waypoint 126 is indicative of a deviation from the travel-path 134, as when the lead-vehicle 114 is moving into the left-turn-lane 144 illustrated in FIG. 7, the controller 132 gives the higher-priority to the travel-path 134 and ignores the lead-path 140. In other words, the host-vehicle 112 does not follow the lead-vehicle 114 when the V2V transmission broadcast by the lead-vehicle 114 indicates the lead-vehicle 114 is going to follow a different lane. This is beneficial because the system 110 prevents the host-vehicle 112 from temporarily following the lead-vehicle 114 into the left-turn-lane 144 before the detection of the lane-marking 118 can be reestablished by the camera 116.

While FIG. 7 illustrates the future-waypoint 126 includes travel into the left-turn-lane 144, it will be understood that the system 110 functions when the lead-vehicle 114 indicates travel into a right-turn-lane (not shown).

Accordingly, a guidance system 10, a controller 32 for the guidance system 10 and a method 200 of operating the guidance system 10 is provided. The guidance system 10 is an improvement over other guidance systems because the system 10 prevents the host-vehicle 12 from temporarily following the lead-vehicle 14 into the left-turn-lane 44 before the detection of the lane-marking 18 can be reestablished by the camera 16.

While this invention has been described in terms of the preferred embodiments thereof, it is not intended to be so limited, but rather only to the extent set forth in the claims that follow.

I claim:

1. A guidance system, said system comprising:
   a camera that detects a lane-marking on a roadway and detects a lead-vehicle traveling ahead of a host-vehicle;
   a vehicle-to-vehicle transceiver that receives a future-route from the lead-vehicle; and
   a controller in communication with the camera and the vehicle-to-vehicle transceiver, the controller;
   determines whether a lane-marking is detected based on the camera;
   in accordance with the determination that the lane-marking is detected, the controller;
   determines a projected-path for the host-vehicle based on the lane-marking;
   in accordance with the determination that the lane-marking is not detected, the controller;
   determines a lead-path of the lead-vehicle based on the camera; and
   determines whether the future-route corresponds to the projected-path;

in accordance with the determination that the future-route corresponds to the projected-path, the controller;
steers the host-vehicle according to the lead-path; and
in accordance with the determination that the future-route does not correspond to the projected-path, the controller;
steers the host-vehicle according to the projected-path.

2. The system in accordance with claim 1, wherein the system further includes a ranging-sensor that detects the lead-vehicle and the controller further determines the lead-path based on the ranging-sensor.

3. The system in accordance with claim 2, wherein the ranging-sensor is a radar.

4. The system in accordance with claim 2, wherein the ranging-sensor is a lidar.

5. The system in accordance with claim 1, wherein the projected-path is a lane-polynomial based on the lane-marking.

6. The system in accordance with claim 5, wherein the controller stores the lane-polynomial in a memory.

7. The system in accordance with claim 1, wherein the lead-path is a lead-polynomial based on the lead-vehicle.

8. The system in accordance with claim 1, wherein the future-route includes travel into a left-turn-lane.

9. The system in accordance with claim 1, wherein the future-route includes travel into a right-turn-lane.

10. The system in accordance with claim 1, wherein the future-route is a future-route-polynomial based on the future-route.

11. A method of operating a guidance system, said method comprising:
detecting, with a camera, a lane-marking on a roadway and a lead-vehicle traveling ahead of a host-vehicle;
receiving, with a vehicle-to-vehicle transceiver, a future-route from the lead-vehicle; and
determining, with a controller in communication with the camera and the vehicle-to-vehicle transceiver, whether a lane-marking is detected based on the camera;
in accordance with the determination that the lane-marking is detected;
determining, with the controller, a projected-path for the host-vehicle based on the lane-marking;
in accordance with the determination that the lane-marking is not detected;
determining, with the controller, a lead-path of the lead-vehicle based on the camera; and
determining, with the controller, whether the future-route corresponds to the projected-path;
in accordance with the determination that the future-route corresponds to the projected-path;
steering, with the controller, the host-vehicle according to the lead-path; and
in accordance with the determination that the future-route does not correspond to the projected-path;
steering, with the controller, the host-vehicle according to the projected-path.

12. The method in accordance with claim 11, wherein the system further includes a ranging-sensor that detects the lead-vehicle and the controller further determines the lead-path based on the ranging-sensor.

13. The method in accordance with claim 12, wherein the ranging-sensor is a radar.

14. The method in accordance with claim 12, wherein the ranging-sensor is a lidar.

15. The method in accordance with claim 11, wherein the projected-path is a lane-polynomial based on the lane-marking.

16. The method in accordance with claim 15, wherein the controller stores the lane-polynomial in a memory.

17. The method in accordance with claim 11, wherein the lead-path is a lead-polynomial based on the lead-vehicle.

18. The method in accordance with claim 11, wherein the future-route includes travel into a left-turn-lane.

19. The method in accordance with claim 11, wherein the future-route includes travel into a right-turn-lane.

20. The method in accordance with claim 11, wherein the future-route is a future-route-polynomial based on the future-route.

21. A guidance system, said system comprising:
a camera that detects a lane-marking on a roadway traveled by a host-vehicle and a lead-vehicle traveling ahead of the host-vehicle;
a vehicle-to-vehicle transceiver that receives a future-route from the lead-vehicle; and
a controller in communication with the camera and the vehicle-to-vehicle transceiver, said controller determines a travel-path for the host-vehicle based on the lane-marking, and follows the lead-vehicle when the future-route coincides with the travel-path.

22. A method of operating a guidance system, comprising:
operating a host-vehicle in travel in a lane of a roadway, wherein operating the vehicle comprises determining, with a controller in communication with a camera, a host-vehicle path based on one or more lane-markings associated with the lane of the roadway;
determining, with the controller, that the lane-markings are no longer detectable;
in response to determining that the lane-markings are no longer detectable:
identifying, with the camera, a forward vehicle travelling ahead of the host-vehicle;
determining, with the controller, a projected-path associated with the forward vehicle; and
if the projected-path associated with the forward vehicle corresponds to the host-vehicle path previously determined based on the one or more lane-markings, operating the host-vehicle, with the controller, to follow the forward vehicle.

23. The method of claim 22, wherein if the projected-path associated with the forward vehicle does not correspond to the host-vehicle path determined based on the one or more lane-markings, operating the host-vehicle, with the controller, to travel according to the host-vehicle path previously determined based on the one or more lane-markings.

* * * * *